US012598085B2

(12) United States Patent (10) Patent No.: US 12,598,085 B2
Smeets et al. (45) Date of Patent: Apr. 7, 2026

(54) CORRELATING REMOTE ATTESTATION QUOTES WITH A VIRTUALIZED NETWORK FUNCTION (VNF) RESOURCE ALLOCATION EVENT

(71) Applicant: TELEFONAKTIEBOLAGET LM ERICSSON (PUBL), Stockholm (SE)

(72) Inventors: Bernard Smeets, Dalby (SE); Cristina Badulescu, Roxboro (CA); Daniel Migault, Montreal (CA); Stere Preda, Longueuil (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 11 days.

(21) Appl. No.: 18/710,567

(22) PCT Filed: Nov. 3, 2022

(86) PCT No.: PCT/IB2022/060607
§ 371 (c)(1),
(2) Date: May 15, 2024

(87) PCT Pub. No.: WO2023/089438
PCT Pub. Date: May 25, 2023

(65) Prior Publication Data
US 2025/0039001 A1 Jan. 30, 2025

Related U.S. Application Data

(60) Provisional application No. 63/280,465, filed on Nov. 17, 2021.

(51) Int. Cl.
*H04L 9/40* (2022.01)
*H04L 9/32* (2006.01)

(52) U.S. Cl.
CPC .............. *H04L 9/40* (2022.05); *H04L 9/3236* (2013.01); *H04L 9/3247* (2013.01)

(58) Field of Classification Search
CPC ....... H04L 9/40; H04L 9/3236; H04L 9/3247; H04L 63/104; G06F 21/44
See application file for complete search history.

(56) References Cited

U.S. PATENT DOCUMENTS 10,447,486 B2 * 10/2019 Turissini ................. G06F 21/31
12,081,678 B2 * 9/2024 Ko ......................... H04L 9/3263
(Continued)

FOREIGN PATENT DOCUMENTS

EP 3466014 B1 7/2020
EP 3217310 B1 5/2021
(Continued)

OTHER PUBLICATIONS

ETSI, Network Functions Virtualisation (NFV) Release 4; Management and Orchestration; Or-Vi reference point—Interface and Information Model Specification, Gs NFV-IFA 005 V4.2.1 (May 2021).
(Continued)

*Primary Examiner* — John B King
(74) *Attorney, Agent, or Firm* — Ericsson Inc.

(57) ABSTRACT

A method, network node and non-transitory computer readable media having stored thereon instructions for correlating a remote attestation quote with a virtualized network function (VNF) resource allocation event. The method comprises obtaining a set of VNF components (VNFCs) that require remote attestation. The method comprises obtaining an attestation quote for each VNFC of the set of VNFCs, the attestation quote ensuring that instances of each VNFC are used in a legitimate context. The method comprises correlating each attestation quote with the VNF resource allocation event.

23 Claims, 9 Drawing Sheets

(56) References Cited

U.S. PATENT DOCUMENTS

| | | | | |
|---|---|---|---|---|
| 2016/0337329 | A1* | 11/2016 | Sood | G06F 21/10 |
| 2017/0048165 | A1 | 2/2017 | Yu | |
| 2017/0230182 | A1* | 8/2017 | Misoczki | H04L 9/3255 |
| 2018/0288101 | A1* | 10/2018 | Sharma | H04L 9/3236 |
| 2019/0028281 | A1* | 1/2019 | Turissini | G06F 21/57 |
| 2019/0073479 | A1* | 3/2019 | Oliver | G06F 21/575 |
| 2019/0245889 | A1* | 8/2019 | Kalliola | H04L 41/28 |
| 2020/0409743 | A1* | 12/2020 | Ni | H04L 41/5041 |
| 2021/0064410 | A1* | 3/2021 | Yun | H04L 41/5041 |
| 2021/0326167 | A1* | 10/2021 | Yang | H04L 41/5054 |
| 2022/0006693 | A1* | 1/2022 | Toeroe | H04L 41/0895 |
| 2023/0131060 | A1* | 4/2023 | Ko | H04L 9/3213 |
| | | | | 713/151 |

FOREIGN PATENT DOCUMENTS

| | | | | | |
|---|---|---|---|---|---|
| EP | 3443500 | B1 | 4/2022 | | |
| WO | 2017178811 | A1 | 10/2017 | | |
| WO | WO-2020102749 | A1 * | 5/2020 | ........... | H04L 63/062 |
| WO | WO-2024223043 | A1 * | 10/2024 | ........... | H04L 9/3236 |
| WO | WO-2024260532 | A1 * | 12/2024 | ........... | H04L 9/0897 |

OTHER PUBLICATIONS

D. Boneh et al., Aggregate and Verifiably Encrypted Signatures from Bilinear Maps, Proceedings of Eurocrypt 2003, LNCS 2656, pp. 416-432, 2003.

ETSI, "Network Functions Virtualisation (NFV) Release 3; Security; Security Management and Monitoring specification", GS NFV-SEC 013 V3.1.1, Feb. 2017.

ETSI, Network Functions Virtualisation (NFV) Release 2; Protocols and Data Models; NFV-MANO procedures specification, GS NFV-SOL 016 V2.8.1 (Aug. 2020).

ETSI, Network Functions Virtualisation (NFV) Release 3; Management and Orchestration; Architecture enhancement for Security Management Specification, ETSI GS NFV-IFA 026 V3.4.1 (Jun. 2020).

ETSI, Network Functions Virtualisation (NFV) Release 3; Protocols and Data Models; RESTful protocols specification for the Or-Vnfm Reference Point, ETSI GS NFV-SOL 003 V3.5.1 (Jul. 2021).

ETSI, Network Functions Virtualisation (NFV) Release 3; Protocols and Data Models; Specification of common aspects for RESTful NFV MANO APIs, GS NFV-SOL 013 V3.5.1 (Jul. 2021).

ETSI, Network Functions Virtualisation (NFV) Release 4; Management and Orchestration; Sc-Or, Sc-Vnfm, Sc-Vi reference points—Interface and Information Model Specification, GS NFV-IFA 033 V4.1.1 (Aug. 2020).

ETSI, Network Functions Virtualisation (NFV); Evolution and Ecosystem; Report on Multi-tenancy in NFV Release 4, GR NFV-EVE 0018 V0.0.13 (Jul. 2021)—Work in Progress.

ETSI, Network Functions Virtualisation (NFV); NFV Security; Report on use cases and technical approaches for multi-layer host administration, GR NFV-SEC 009 V1.2.1 (Jan. 2017).

ETSI, Network Functions Virtualisation (NFV); Security; Report on NFV Remote Attestation Architecture, GR NFV-SEC 018 V1.1.1 (Nov. 2019).

ETSI, Network Functions Virtualisation (NFV); Security; Security Management, Release 4, GS NFV-SEC 024 , version 0.0.6 Draft (Apr. 2021)—Work in Progress.

ETSI, Network Functions Virtualisation (NFV); Terminology for Main Concepts in NFV, GR NFV 003 V1.6.1 (Mar. 2021).

ETSI, Network Functions Virtualisation (NFV); Trust; Report on Attestation Technologies andPractices for Secure Deployments, GR NFV-SEC 007 V1.1.1 (Oct. 2017).

H. Birkholz et al., Remote Attestation Procedures Architecture, RATS Working Group, Internet-Draft, Nov. 8, 2021.

ISR and Written Opinion dated Jan. 30, 2023, from corresponding application PCT/IB2022/060607.

Office Action for Indian Patent Application No. 202417032812, mailed Nov. 4, 2025, 12 pages.

* cited by examiner

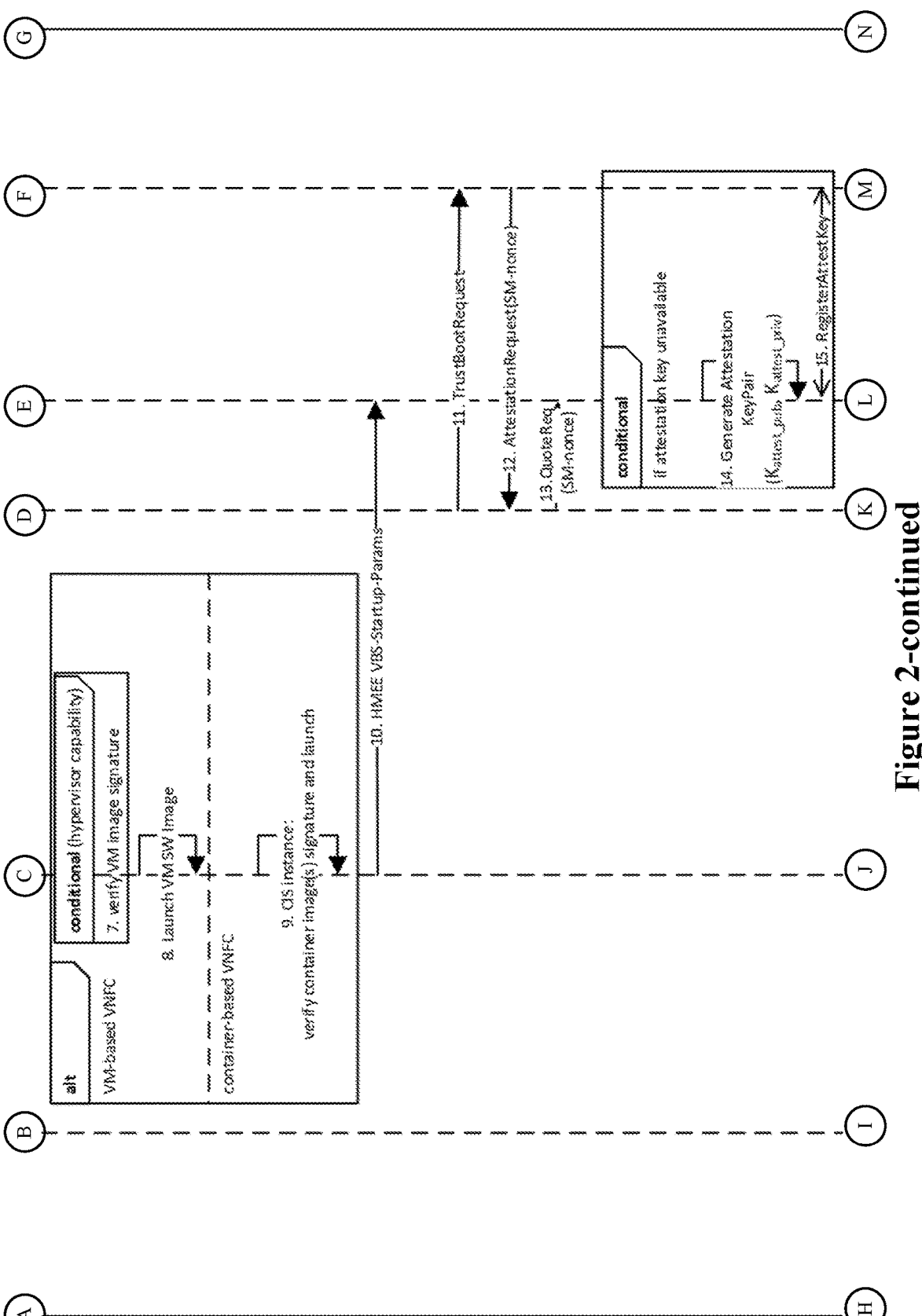
Figure 2-continued

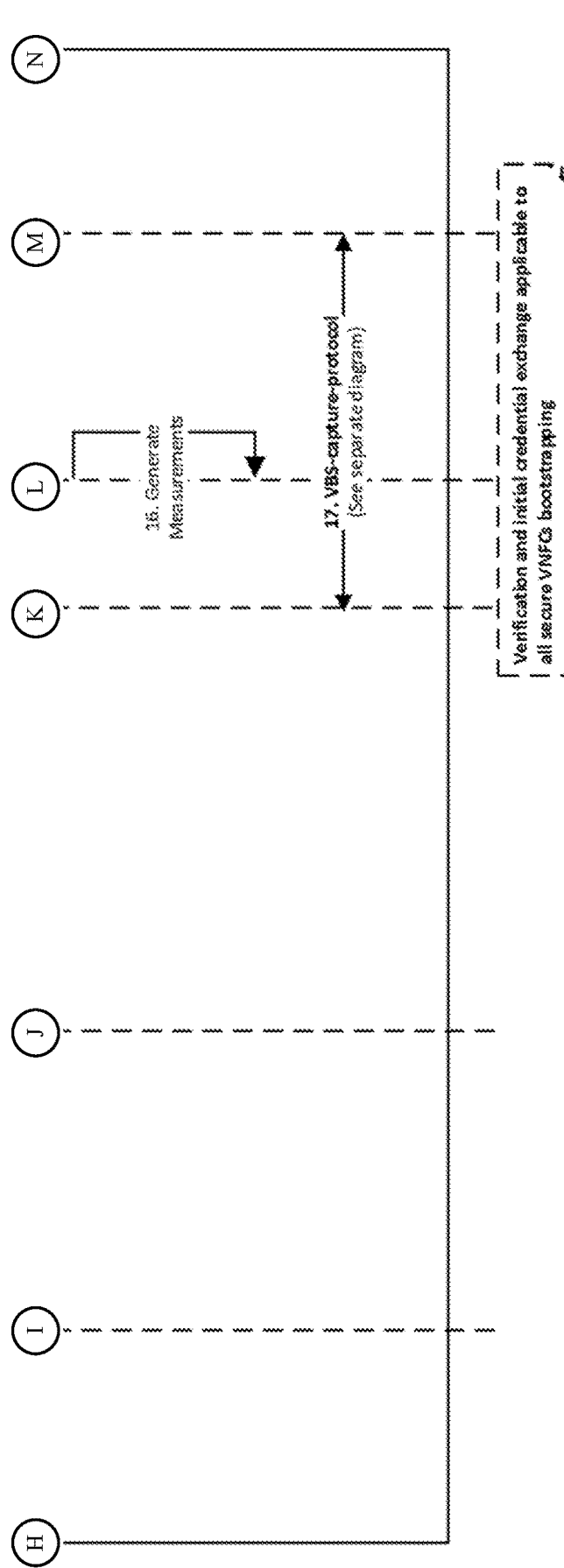
Figure 2-continued obtaining a set of VNF components (VNFCs) that require remote attestation

602 obtaining an attestation quote for each VNFC of the set of VNFCs, the attestation quote insuring that instances of each VNFC are used in a legitimate context

604 correlating each attestation quote with the VNF resource allocation event

CORRELATING REMOTE ATTESTATION QUOTES WITH A VIRTUALIZED NETWORK FUNCTION (VNF) RESOURCE ALLOCATION EVENT

PRIORITY STATEMENT UNDER 35 U.S.C. § 119(E) & 37 C.F.R. § 1.78

This non-provisional patent application claims priority based upon the prior U.S. provisional patent application entitled "CORRELATING REMOTE ATTESTATION QUOTES WITH A VIRTUALIZED NETWORK FUNCTION (VNF) RESOURCE ALLOCATION EVENT", application No. 63/280,465, filed Nov. 17, 2021, in the names of Smeets et al.

TECHNICAL FIELD

The present description relates to the deployment, instantiation and operation of virtualized network functions (VNFs) on secure and trustworthy platforms.

BACKGROUND

Service providers, e.g., mobile virtual network operators (MVNOs), often require that their virtualized network functions (VNFs) be deployed, i.e., instantiated, operated, with assurance that they run securely on a trustworthy platform, i.e., network functions virtualization infrastructure (NFVI) including both virtual machines (VMs) based infrastructure and operating system container-based infrastructure. Means to verify trust-related information of these platforms must therefore be provided, see ETSI GR NFV-SEC 007 V1.1.1 (2017 October) Network Functions Virtualisation (NFV); Trust; Report on Attestation Technologies and Practices for Secure Deployments.

A commonly used technique to verify trust-related information is the so-called platform "attestation", which has already been explored in the context of Trusted Computing. For example, the Trusted Platform Module (TPM), is a dedicated security chip used to perform specific cryptographic operations, such as key generation, signing and secure storing of keys; the TPM can attest the platform state and configuration to interested parties. Similar attestation capabilities exist in trusted hardware realizations such as Intel® Software Guard Extensions (SGX) and AMD Secure Encrypted Virtualization (SEV).

An attestation implies: (1) anchoring the trust to the hardware (HW), i.e., considering that the Root of Trust (RoT) is in HW; and (2) validating that the right software is run on the trusted hardware. For the specific area of secure enclaves, trusting the HW typically means trusting the central processing unit (CPU) providing the secure execution technology referred by Intel® as an enclave technology (term referred to as Hardware-Mediated Execution Enclave (HMEE) at European Telecommunications Standards Institute (ETSI) NFV security (SEC)-HW mediated execution enclave). Secure enclaves are HW enforced and are isolated secure execution environments which together with a HW vendor identity act as RoT for attestation. With this, a tenant can gain assurance that a VNF Instance (VNFI) with the inherent VNF Component Instances (VNFCIs) is running on the right CPU (with the right version, Basic Input/Output System (BIOS), firmware).

The concept of attestation continues to be explored in different fora. For instance, in ETSI GR NFV-SEC 018 V1.1.1 (2019 November) Network Functions Virtualisation (NFV); Security; Report on NFV Remote Attestation Architecture, two types of attestation are described: local vs. remote attestation, depending on whether the attestation verifier sits on the same platform for local attestation; or off-platform, in case of remote attestation. The process of remote attestation usually involves the following steps: (1) gathering information on the system "A", (2) reporting all the information to a different system "B" (i.e., verifier) and (3) evaluating on basis of a comparison between the reported information for system "A" and well-known reference information (aka golden measurements). In ETSI GR NFV-SEC 018 V1.1.1 (2019 November), a high-level architecture for remote-attestation is presented, which can be mapped to currently existing technologies, such as Intel® SGX. Furthermore, a more detailed remote-attestation procedure (referred to hereafter as "SEC024-procedure") applicable to those VNFs requiring secure bootstrapping with remote-attestation has recently been proposed in ETSI GS NFV-SEC 024, draft 0.0.6 (2021 April) Network Functions Virtualisation (NFV); Security; Security Management Release 4 by Ericsson. Such VNF requiring secure bootstrapping is assumed to have one or several VNF Components (VNFCs) subject to secure bootstrapping with remote attestation. Successful VNF instantiation implies secure instantiation of these VNFCs according to the security policy. This SEC024-procedure expands on a previously published procedure in ETSI GS NFV-SEC 013 V3.1.1 (2017 February) Network Functions Virtualisation (NFV) Release 3; Security; Security Management and Monitoring specification, proposed by Intel®, as follows: (1) both virtual machines (VMs) and container-based VNFCs are explicitly covered; (2) Internet Engineering Task Force (IETF) Remote Attestation Procedures (RATS) architecture, IETF Internet draft, draft 12, Remote Attestation Procedures Architecture draft-ietf-rats-architecture-22, is taken into account; (3) several new security operations are proposed (e.g., attestation key derivation in HMEE). Nonetheless, a problem with existing SEC024-procedure still exists.

SUMMARY

As discussed in the previous section, the current SEC024-procedure is applicable to both VM-based VNFs and container-based VNFs. A VNF requiring secure bootstrapping is assumed to have one or several VNF Components subject to secure bootstrapping with remote attestation. Successful instantiation of such VNF implies secure instantiation of every VNFCs according to the tenant's security policy.

A robust implementation of the SEC024-procedure should provide a solution to the problem stated next.

Problem statement: any of the VNFCs which are part of the VNF and are subject to secure bootstrapping with remote attestation should not be individually instantiated and successfully attested outside the context of a VNF event related to resource allocation, such as VNF Instantiation, Scaling-out and Healing. In other words, this means that the remote attestation procedure of such VNFCs should be correlated with the VNF lifecycle management (LCM) events such as VNF Instantiation, Scaling-out, Healing, as per the tenant's security policy.

Note that in the context of the above stetting existing attestation solutions only are basic building blocks that allow a tenant to securely assess the state of the other (remote) party.

Specifically, in the context of ETSI NFV SEC standards, solutions to this requirement are left as open problems.

There is provided a method, executed in a security manager (SM), for correlating remote attestation quotes with a virtualized network function (VNF) resource allocation event. The method comprises obtaining a set of VNF components (VNFCs) that require remote attestation. The method comprises obtaining an attestation quote for each VNFC of the set of VNFCs, the attestation quote ensuring that instances of each VNFC are used in a legitimate context. The method comprises correlating each attestation quote with the VNF resource allocation event.

There is provided a network node comprising processing circuits and a memory, the memory containing instructions executable by the processing circuits whereby the network node executes a security manager (SM) for correlating remote attestation quotes with a virtualized network function (VNF) resource allocation event. The network node is operative to obtain a set of VNF components (VNFCs) that require remote attestation. The network node is operative to obtain an attestation quote for each VNFC of the set of VNFCs, the attestation quote ensuring that instances of each VNFC are used in a legitimate context. The network node is operative to correlate each attestation quote with the VNF resource allocation event.

There is provided a non-transitory computer readable media having stored thereon instructions for correlating remote attestation quotes with a virtualized network function (VNF) resource allocation event. The instructions comprise obtaining a set of VNF components (VNFCs) that require remote attestation. The instructions comprise obtaining an attestation quote for each VNFC of the set of VNFCs, the attestation quote ensuring that instances of each VNFC are used in a legitimate context. The instructions comprise correlating each attestation quote with the VNF resource allocation event.

The method, network node and computer readable media provided herein present improvements to the deployment, instantiation and operation of virtualized network functions (VNFs) on secure and trustworthy platforms.

BRIEF DESCRIPTION OF THE DRAWINGS

FIG. 7 is a schematic illustration of a virtualization environment in which the method, network node and computer readable media described herein can be deployed.

DETAILED DESCRIPTION

Figure 1:
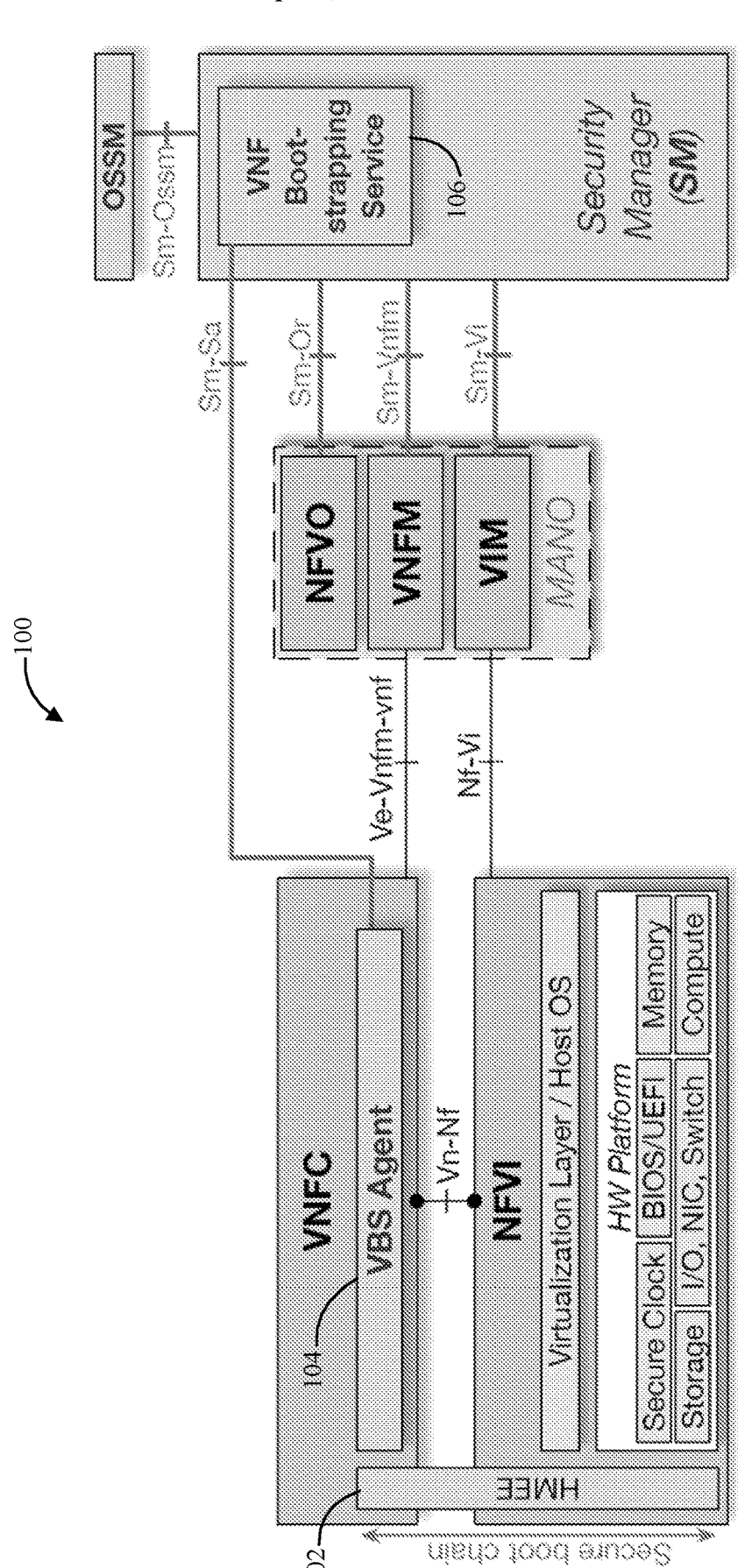
FIG. 1 is a block diagram of Secure VNF Bootstrapping Service (VBS) (from clause 6.1.2.1 of the SEC024-procedure).

Various features will now be described with reference to the drawings to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

Herein, a method and mechanisms are proposed to solve the problem expressed previously. The method and mechanisms comprise the following elements.

The method and mechanisms use as example the current ETSI NFV Management and orchestration (MANO) architecture with the remote attestation Verifier implemented in a Security Manager (SM).

The method and mechanisms use a standard identifier (ID) related to the VNF instance (e.g., specified by ETSI NFV) as part of the input to a procedure of correlating attestation quotes recorded on the remote attestation Verifier with selected VNF LCM events such as VNF Instantiation, Scaling-out and Healing. This ID identifies the VNF LCM event context and is set by the NFV-MANO before the attestation phase.

Note: based on the ETSI NFV standards and other industry solutions e.g., Open Network Automation Platform (ONAP) or Open Radio Access Network (O-RAN), there is no guarantee for the necessary and sufficient standard IDs related to VNFC instances (i.e., to identify the allocated virtualized compute resources) to be available in order to implement a straightforward correlation with the attestation quotes, when these attestation quotes are recorded by the Verifier. Hence, the next items are useful.

The method and mechanisms include having relevant information sent to the SM, on the remote attestation procedure for a VNF composed of VNFCs subject to secure bootstrapping with remote attestation. Several types of information are derived by the SM, such as: the VNFCs expected to be remotely attested alongside the number of VNFC instances that are permitted to be attested and an attestation time-window.

The method and mechanisms implement an attestation quote correlation at the SM level, by computing a fingerprint of the VNFC image by both the attester and the verifier to be checked during the VNF attestation procedure; this fingerprint is combined with the attestation quote (signed and sent by the attester), using the relevant information described above. The fingerprint comprises any characteristic that can be computed from the VNFC image such as, for example, a hash value of the VNFC code image.

This solution implies that the VNF vendor (e.g., Ericsson) should implement a VNFC-image-fingerprinting routine to fingerprint the VNFC image.

A solution variant is also proposed relying on an NFVI security agent, useful in case of VNF vendors not implementing the VNFC-image-fingerprinting routine.

Finally, two enhancements are discussed.

The solution proposed here has several advantages. It implements a trustworthy VNF instantiation bootstrap. It eliminates or reduces dependence on an NFVI security agent (usually 3rd party). It also relaxes requirements for a fully trusted NFVI security agent, in the solution variant (no private keys are handled by this agent).

The solution does not require enhancements on the main management and orchestration architectures, e.g., in the ETSI NFV case on the NFV-MANO architectural framework functional blocks: NFV orchestrator (NFVO), VNF Manager (VNFM) and Virtualized Infrastructure Manager (VIM). Overhead is expected to be minimal on the Security Manager which implements the quotes correlation.

While the solution is presented in the context of ETSI NFV, it is independent of the actual management and orchestration architecture and solution. For example, in O-RAN context, the ETSI NFV function blocks (like NFVO, VNFM, VIM) can be replaced by the O-RAN equivalents, such as the Service Management & Orchestration (SMO), Network Function Orchestrator (NFO) functions and the respective O-Cloud entities.

The solution described herein is articulated on the ETSI NFV MANO framework, but it can work in any type of management and orchestration architecture and solution. The scope of the solution considers a VNF to be instantiated on an NFVI (using either VM-deployment or containerized-deployment), with the VNF being designed to be securely bootstrapped with its VNFM and/or its Element Manager (EM) through a so-called VNF Bootstrapping Service (VBS) and with Hardware-Mediated Execution Enclave (HMEE). Other events such as VNF Scaling, Healing, can be addressed with the solution presented herein.

Typical implementations of a VNF secure bootstrapping procedure considers successful completion of two phases, see SEC024-procedure:

1) Phase-1: attestation that the VNF is being instantiated in a trustworthy manner; and
2) Phase-2: following Phase-1, a first set of secure credentials are installed in the VNF.

As explained previously, a VNF is composed of VNF Components (VNFCs), which deliver sub-sets of VNF's functionality with the main characteristic that a single instance of a VNF component maps 1:1 against a single Virtualization Container, see ETSI GR NFV 003 V1.6.1 (2021 March) Network Functions Virtualisation (NFV); Terminology for Main Concepts in NFV. Examples of Virtualization Containers include virtual machines and Operating System (OS) containers. A VNF requiring secure bootstrapping is assumed to have one or several VNFCs subject to secure bootstrapping. Successful VNF instantiation means secure instantiation of these VNFCs according to the security policy.

The solution provided herein addresses Phase-1 with an impact on Phase-2. It is assumed that the NFVI contains the HMEE(s) necessary to those VNFC Instances requiring to be securely bootstrapped and remotely attested. Attestation of VNF involves sending signed reports (aka quotes) on every HMEE associated to such VNFCs, the attestation reports containing security related attributes on the HMEE and possibly on application code and user data loaded into the HMEE.

The SEC024-procedure (still a draft at the time of priority filing this application) describes a block diagram of the entities concerned with executing the VBS bootstrapping with HMEE, which is the SEC024-procedure. FIG. 1 illustrates the secure VBS block diagram 100, of which the main functions are listed below.

HMEE 102: defined in ETSI GR NFV-SEC 009 V1.2.1 (2017 January) Network Functions Virtualisation (NFV); NFV Security; Report on use cases and technical approaches for multi-layer host administration. Examples include secure enclaves such as Intel® Software Guard Extensions (SGX).

Figure 2:
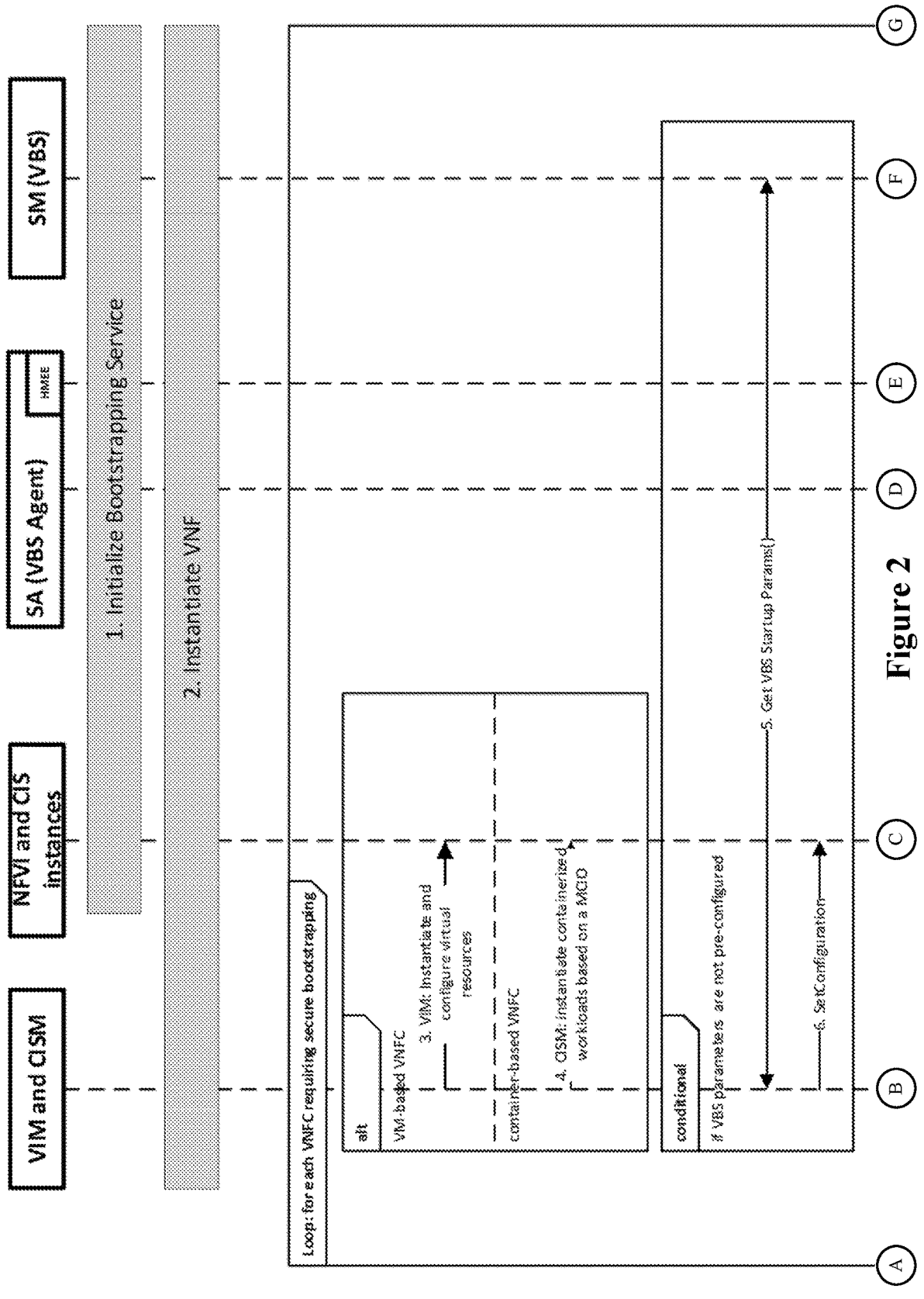
FIG. 2 is a sequence diagram of the SEC024-procedure.

VBS Agent 104: a security agent (SA) as a component in the VNFC that relies on HMEE with the role of Attester in the SEC024-procedure (FIG. 2). More specifically, a portion of the VNFC code implements the VBS Agent which, in turn, runs with HMEE and is dedicated to executing a routine to send an attestation signed quote to the VBS.

VNF Bootstrapping Service (VBS) 106: The VBS is proposed to be contained within a Security Manager (SM). It has the role of attestation Verifier.

FIG. 2 illustrates the SEC024-procedure previously proposed by Ericsson is included herein in its entirety by reference.

All steps in FIG. 2 alongside an example of quote generation is described in the SEC024-procedure clause 6.1.2.2. Clause 6.1.2.2 is reproduced below (without editor notes and up to the example of quote creation process in an HMEE).

6.1.2.2 Secure Bootstrapping Protocol

The choice between pre-provisioning and dynamic automated provisioning of security management is presented to the security administrator. If pre-provisioning security management is chosen as the infrastructure policy, then the security agents (SAs) are deployed as part of the NFVI. SAs can also be dynamically provisioned, in a scale in/out manner. VIM deploys and instantiates various SAs on NFVI and within MANO. SA options (e.g., SAs like IDS, IPS, Firewall, DLP, Security Monitoring Agents, Telemetry Collectors) will be presented in the SM. Deployment policies may also dictate specific types and numbers of instances of SAs to be pre-provisioned or dynamically deployed into the infrastructure. The SM validates and performs runtime management to ensure that all the required SAs are deployed, instantiated and activated per policy.

Figure 6:
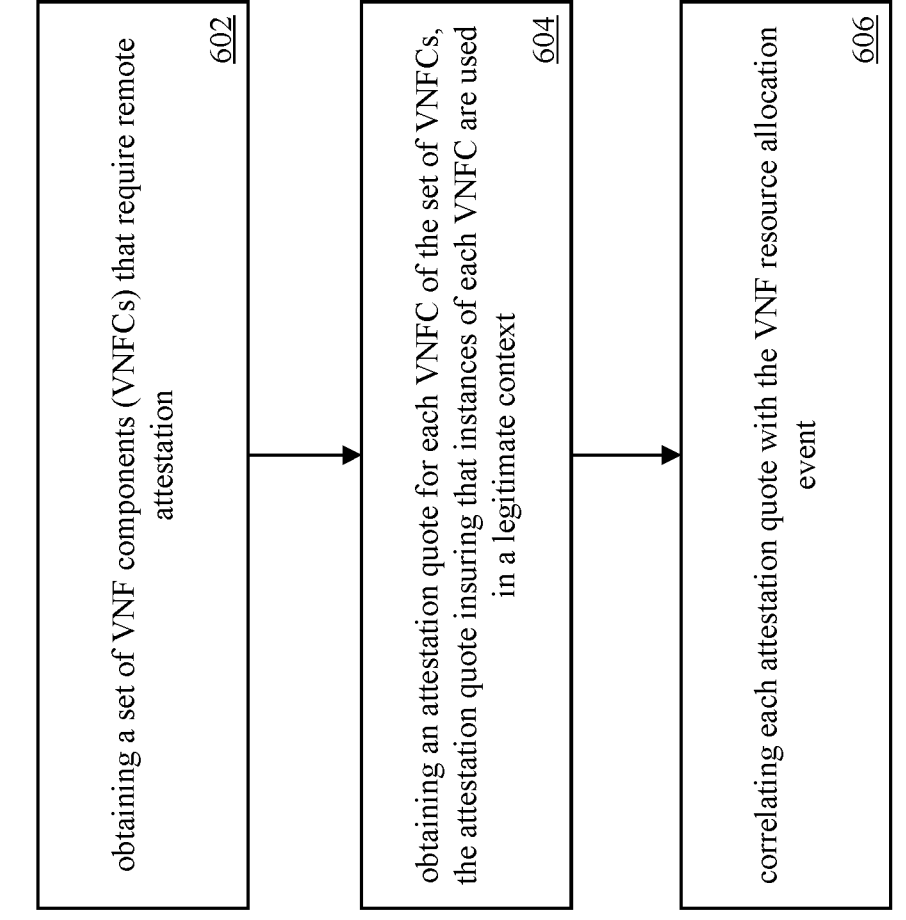
FIG. 6 is a flowchart of a method for correlating a remote attestation quote with a virtualized network function (VNF) resource allocation event.

The protocol description in FIG. 6.1.2.2-1 [FIG. 2 herein] represents one alternative of secure provisioning in case of VNF instantiation requiring secure bootstrapping with VBS.

NOTE: The exact definition of the different steps and handling are not presented in the current document.

The VBS instance shall ensure that VBS server-side protocol messages are correlated with VNF events related to resource allocation (e.g., VNF instantiation, scaling-out, healing) and according to the service provider policy.

NOTE: For example, attestation requests should not be triggered in case of isolated attempts for VNFC instantiation outside the scope of a VNF instantiation or outside the scope of scaling-out operation, in which case VNFC instantiation should fail.

A VNFC instance maps to a single VM in case of hypervisor-based virtualization or to one or several OS containers for OS container virtualization. The VIM verifies the VM images when they are imported into VIM after VNF package onboarding.

The secure provisioning in case of VNF instantiation requiring secure bootstrapping cf FIG. 6.1.2.2-1 [FIG. 2 herein] works as follows:

1. VBS shall have been initialized. Further details of step 1 for this protocol are not defined in this document but are assumed to be responsibilities of the system and security administrators. For example, this step of offline bootstrapping enables enforcing the policy checks required in this protocol (e.g., allow-lists, reference value provisioning, attestation appraisal policy rules).

2. Instantiation of VNF is triggered within NFV-MANO, e.g., in case of NS instantiation. At VNF instance resource provisioning, the VNFCs subject to secure bootstrapping and according to the security policy are instantiated following steps 3 to 17.

3. If the VNFC is VM-based, then VIM triggers instantiation and configuration of the virtualized resources part of the VNFC (step 3).

4. If the VNFC is based on OS containers, then CISM triggers instantiation and configuration of the virtualized resources part of the VNFC (step 4).

At this stage, the VBS start-up parameters are either available (pre-configured) or need to be acquired (step 5 and 6).

5. If the VBS parameters are not available (i.e., they are not pre-configured), then the VBS parameters are acquired through interacting with the VBS instance.

6. The VBS start-up parameters acquired through interacting with the VBS instance in the previous step are made available to the NFVI instance (in case of VM-based VNFC) or to the CIS instance in case of VNFC based on OS containers.

7. If the VNFC is VM-based, then the VM image signature should be verified by the hypervisor.

NOTE: Not all hypervisors are known to support VM image signature validation at VM image booting. The support of VM image validation at instantiation should be known in advance. Not only the hypervisor could be responsible of this aspect. The security policy dictates whether the instantiation may happen without validation.

8. If the VNFC is VM-based, then the VM image is launched and step 10 follows.

9. If the VNFC is based on OS containers, then the CIS instance verifies the container image(s) signatures at CIR image pulling and launches the container(s) and step 10 follows.

10. The VBS instance parameters are made available for the portion of SA software executing in the HMEE and responsible with secure attestation and bootstrapping.

Security Management VNF descriptors comprise of tags that define security requirements. As such an SM will need to be notified if the VNF descriptors change, since the SM defines the Security Groups and forms association of VNF descriptors to Security Groups. This defines the VNF's Security Group membership. VNF descriptors also make Security Group memberships dynamic and as the descriptors change, a VNF could change group membership. Each Security Group can have a Security Policy bound to it, which also defines the virtual security management control to be inserted Since the SM is notified about changes of those descriptors, it would then run the necessary provisioning steps, including this Secure Bootstrap protocol.

NOTE: VBS start-up parameters (e.g., VBS public key, IP address or FQDN) are not detailed in the present document. The NFVI virtualization management/host OS layer registers these start-up parameters with the platform HMEE. At this stage, the VNF operationState is Processing.

11. An indication of secure boot is triggered towards the VBS instance (SM) in step 11.

12. The VBS instance responds to the request in the previous step by sending an attestation request including a nonce (SM-nonce in step 12).

13. The VBA Agent requests the HMEE with an attested quote (step 13) including the SM nonce.

At this stage, a key for attestation purposes may be available or may be generated in the HMEE in step 14.

14. If an attestation key is not already available, then such a key is generated inside HMEE. A typical implementation considers generating a VNF Public/Private key pair for attestation purposes.

NOTE: different protocol implementations may rely on other types of VNF attestation keys, such as symmetric key or group signing keys, etc.

The attestation key shall be proved to be bound to the HMEE instance and shall serve only a limited set of cryptographic operations related to secure bootstrapping and attestation in step 15.

15. In case the attestation key is generated in the previous step, the mechanisms (e.g., a dedicated protocol) to register and prove its association to the HMEE instance are not defined in this document.

16. One or a set of measurement reports are generated and an attestation quote is produced, which covers, among others, the SM-nonce. An example of quote generation is provided below.

17. The VBS Agent then executes the VBS Capture Protocol with the VBS, and upon successful completion of all the steps, initiates the VNFC.

Figure 3:
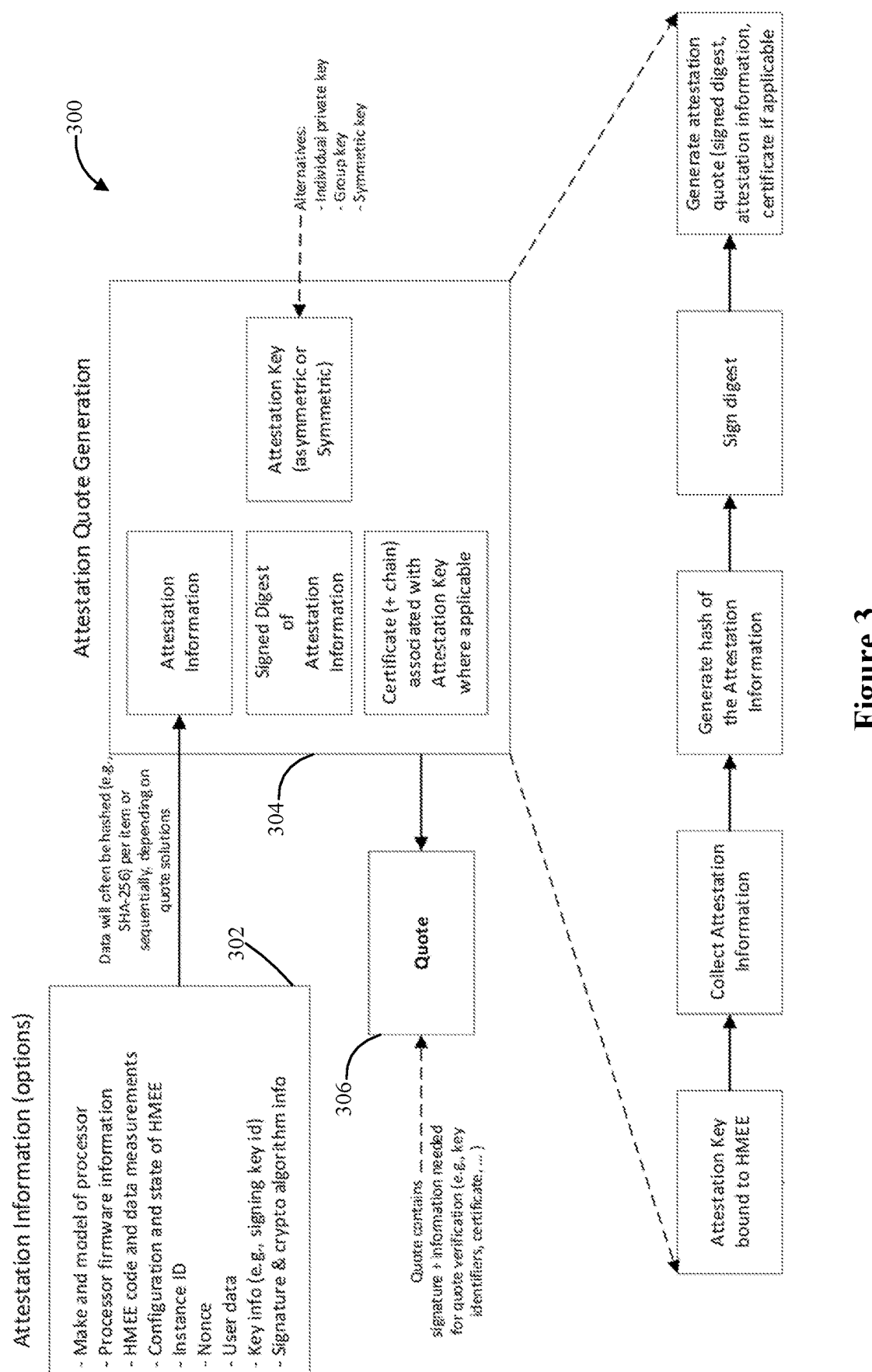
FIG. 3 is a block diagram illustrating an example of Quote Creation Process in an HMEE according to the SEC024-procedure.

An example of attestation quote generation process in an HMEE (step-16) is illustrated in FIG. 6.2.2-2 [FIG. 3 herein]:

Input to quote generation is represented by the Attestation Information, which covers various data, including the SM Nonce.

Typical implementations consider hashing the Attestation Information and signing the resulted digest.

The Attestation Key binding to the HMEE and its hosting hardware is realized using hardware specific keys. The quote data generated allows verification of this binding.

For every VNFC part of the VNF requiring secure bootstrapping with VBS and HMEE, steps 11 to 17 involve the VBS Agent and various cryptographic operations (generate attestation key, generate measurements, etc.) executed in HMEE. An important construct is the "SM-nonce" (steps 12 and 13) which is a nonce controlled by the Verifier to be covered in the quote generation.

FIG. 3 illustrates the example 300 of quote generation of FIG. 6.1.2.2-2 of the SEC024-procedure.

Attestation information 302, such as make and model of the processor, processor firmware information, HMEE code and data measurement, configuration and state of the HMEE, instance ID, nonce, user data, key information (e.g. signing key ID), signature and cryptography algorithm information are provided to an attestation quote generation module 304. The data provided to the attestation quote generation module 304 can be hashed (e.g. with SHA-256) per item or sequentially, depending on quote solutions. The attestation quote generation module 304 comprises four subcomponents: the attestation information, the signed digest of the attestation information, an attestation key (asymmetric or symmetric) which could alternatively include an individual private key, a group key or a symmetric key and a certificate with eventual certificate chain associated with the attestation key where applicable. The attestation quote generation module 304 generates the quote 306, which contains a signature and the information needed for quote verification (e.g. key identifiers, certificate, etc.) The attestation quote generation module 304 executes four steps to generate the quote: binding the key to the HMEE (where applicable), collecting the attestation information, generating a digest (e.g. hash) of the attestation information, signing the digest and generating the attestation quote which includes the signed digest, the attestation information and a certificate if applicable.

The attestation Verifier is proposed to be implemented within a Security Manager. Although real deployments may choose to separate the Verifier from the SM, the choice of collocating the Verifier with an SM is judicious: as a particular NFV-MANO entity. Referring to ETSI GS NFV-IFA 026 V3.4.1 (2020 June) Network Functions Virtualisation (NFV) Release 3; Management and Orchestration; Architecture enhancement for Security Management Specification and ETSI GS NFV-IFA 033 V4.1.1 (2020 August) Network Functions Virtualisation (NFV) Release 4; Management and Orchestration; Sc-Or, Sc-Vnfm, Sc-Vi reference points—Interface and Information Model Specification, the SM subscribes to MANO events (NS/VNF instantiation, etc.) through the interfaces defined in ETSI GS NFV-IFA 033 V4.1.1 (2020 August). An SM in active mode can also trigger enforcement of security policies. Thus, in case the attestation quote verifications fail, the SM can directly trigger VNF termination or VNF placement in quarantine surrounded by firewalls, etc.

At the end of the SEC024-procedure, the successful VNCI attestation (result of step-17) guaranteeing that the VNFCI runs on the trusted NFVI determines the VNFCI to acquire or generate a so-called "initial credential" or a set of secure credentials (see next sub-section). This corresponds to Phase-2 above.

The rationale for the solution proposed herein is now explained. In addition to guaranteeing that the "right software runs on the right HW", the VNFCI initial credentials mentioned above are typically used by the VNFCI in subsequent critical security procedures such as certificate enrollment (i.e., the VNFCIs requests certificates) to further bootstrap secure communications (e.g., Transport Layer Security (TLS) sessions) with MANO and with other VNF-CI(s), or the insertion of key material that is used to encrypt/decrypt sensitive data used by the VNFC. Nonetheless, the native SEC024-procedure in FIG. 2 would be successful and would allow VNFC instantiation and "initial credential" acquiring if only the {step-1 Ito step-17} sequence was executed, i.e., a VNFC instantiation outside the context of a VNF instantiation.

Based on the latest published ETSI NFV standards (i.e., ETSI GS NFV-IFA 005 V4.2.1 (2021 May) Network Functions Virtualisation (NFV) Release 4; Management and Orchestration; Or-Vi reference point—Interface and Information Model Specification and ETSI GS NFV-SOL 003 V3.5.1 (2021 July) Network Functions Virtualisation (NFV) Release 3; Protocols and Data Models; RESTful protocols specification for the Or-Vnfm Reference Point) at the time of filing this application, and taking the "VNF Instantiate" LCM event as example, the ETSI NFV specifications do not guarantee that the necessary and sufficient identifiers (IDs) related to the VNFC instances are available during the SEC024-procedure of FIG. 2 in order to be used for/by the SM/Verifier to verify that the attestation is triggered legitimately. More specifically, with reference to FIG. 2:

Although the VnfInstance object is created and maintained by the VNFM at step-2, the standards do not guarantee that the InstantiatedVnfInfo information element (IE) containing the VnfcResourceInfo IEs (with standard VNFC IDs) is populated before the bootstrap of all VNFCs. During this bootstrap, the VNF is in state NOT_INSTANTIATED.

Only after the whole LCM operation (VNF Instantiate) is it in status COMPLETED, these VnfcResourceInfo IEs (for every VNFC part of the VNF) become available. This aspect can also be confirmed by step-15 in FIG. 5.2.3-1 from ETSI GS NFV-SOL 016 V2.8.1 (2020 August) Network Functions Virtualisation (NFV) Release 2; Protocols and Data Models; NFV-MANO procedures specification: the SEC024-procedure executes between step-13 and step-15 (before step-15) in that sequence flow, i.e., during the "Boot virtualized compute resources and inject basic config".

It was stated previously that the SM can be notified by MANO on VNF LCM events. If these VNFC IDs (from the VnfcResourceInfo IEs) were available during the attestation phase and taken as input to the quote generation (FIG. 3) as "user-data", then the SM with its attestation Verifier could simply compare the VNFC IDs received from MANO in the VNF Instantiate LCM event with those contained in the received attestation quotes. In the absence of these VNFC IDs, such straightforward correlation is impossible.

It is in this context that the solution is proposed to detect and block attestation attempts outside the context of a VNF event related to resource allocation such as VNF Instantiation, Scaling-out and Healing.

The proposed solution does not require a protected MANO-to-VNFCI channel (i.e., the Sm-Sa interface in FIG. 1) before and during the SEC024-procedure. The MANO-to-SM (i.e., the Sm-Or interface in FIG. 1) is a secure channel. ETSI GS NFV-SOL 013 V3.5.1 (2021-07) Network Functions Virtualisation (NFV) Release 3; Protocols and Data Models; Specification of common aspects for RESTful NFV MANO APIs mandates TLS on the NFV-MANO interfaces, hence on the MANO-to-SM interfaces as well.

Figure 4:
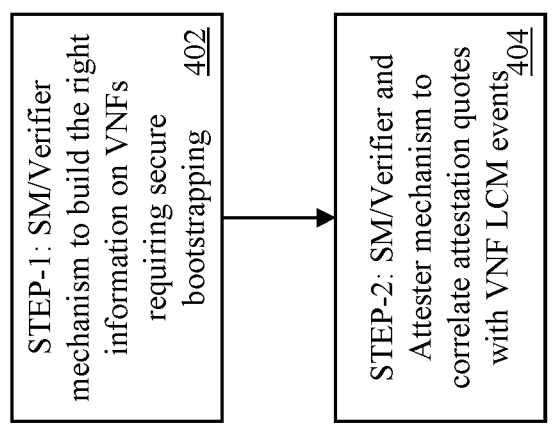
FIG. 4 is a high-level flowchart of the solution provided herein.

Referring to FIG. 4, the solution 400 comprises the following steps with corresponding mechanisms.

STEP-1, 402: SM/Verifier mechanism to build the right information on VNFs requiring secure bootstrapping.

During this STEP-1, the SM/Verifier builds relevant information on the VNFs expected to be securely bootstrapped with remote attestation and HMEE.

For every VNF composed of at least one VNFC requiring secure bootstrap with VBS and remote attestation, the following information is conveyed to the Security Manager (Verifier) from the VNF package:

Info-A: The set of VNFCs subject to the remote attestation procedure for the given VNF package.

Info-B: The maximum number of instances that can be attested and running for a given VNFC. In other words, there is a maximum number of attested VNFC instances at any time, dictated by the VNF provider.

Info-C: A parameter with a meaning of "attestation-time-window" for the Verifier as follows: upon notification of the InstantiateVnfRequest event from MANO the SM starts a timer for a period of attestation-time-window units of time (e.g., minutes). During this time interval, the remote attestation quotes for the one or several VNFCs that are part of the given VNF requiring remote attestation are expected to be received by the Verifier. This parameter is set by the VNF provider.

Some alternatives of how this relevant information (Info-A, Info-B and Info-C) can be encoded in a VNF package and/or VNF Descriptor (VNFD) include:

Relying on the vdu_profile from VNFD for the maximum number of instances (for Info-B).

The following example of "vdu_profile" attribute in VNFD, from the VNF Package, indicates for a given VNF Component the number of replicas to be run at any time (here, minimum 2 and maximum 5 instances of this VNFC):

```
vdu_profile:
min_number_of_instances: 2
max_number_of_instances: 5
```

Relying on the "NFVI constraints" attribute of the VNFD to define a new "secure remote attestation" object mapped 1:1 to an HMEE requirement (for Info-A). MANO could simply convey this "NFVI constraints"

information to a registered Security Manager. MANO is not required to interpret such object, semantics of which are relevant only to the SM implementing the Verifier.

Via other package artifacts.

Via the SM-OSSM interface (FIG. 1) in the SEC024-procedure (in v0.0.6 which is latest at the time of filing this application, requirements are not specified for this interface).

From these Info-A, Info-B and Info-C items above, and as a minimum, the following three relations should be understood and are dynamically built by the SM/Verifier following, e.g., every VNF package onboarding:

ComponentRemoteAttestSet: VNFset↔VNFCset, where VNFset is the set of VNFs onboarded and the VNFCset is the set of VNF components (part of these onboarded VNFs), which require remote attestation.

Example: ComponentRemoteAttestSet($VNF_A$)={$VNFC_{A_1}$, $VNFC_{A_2}$, $VNFC_{A_3}$, . . . } means that $VNF_A$ includes the several $VNFC_{A_x}$ components that are subject to remote attestation when $VNF_A$ is instantiated.

VNFCmaxInstantAttest: VNFset×VNFCset→$\mathbb{N}$. This relation seems redundant with the previous one, but there may be reusing of a VNFC in different VNFs and the requirement for remote attestation for a same VNFC may be different in different VNFs.

Example: VNFCmaxInstantAttest($VNF_A$, $VNFC_{A_m}$)=5 means that the $VNFC_{A_m}$ component m can have a maximum five simultaneous instances that can be attested when $VNF_A$ is instantiated. Any more attestation requests corresponding to instantiation attempts of this component should be refused by the Verifier as long as there are five running VNFCIs.

AttestTimeWindow: VNFset$\mathbb{N}$ means that the remote attestation of a VNF (part of VNFset) implies that the remote attestation quotes for the corresponding VNFCs must arrive to the Verifier during a time interval (e.g., in minutes) after the VNF LCM event (e.g., VnfInstantiateRequest).

Example: AttestTimeWindow($VNF_A$)=1, means that the attestation quotes from the VNFCs of $VNF_A$ must reach Verifier in less than one minute after the SM is notified the VnfInstantiateRequest for $VNF_A$.

STEP-2, 404: SM/Verifier and Attester mechanism to correlate attestation quotes with VNF LCM events.

This step reuses an ETSI NFV standard ID computed by MANO and associated with context of the VNF LCM event. Taking the case of VNF instantiation as an illustrative example, this ID is referred to as "ID_VNF_instantiate", which may be implemented by the standard lifecycleOperationOccurrenceId ID: an identifier of the LCM operation associated with the grant request originating the MANO-VNFM (ETSI GS NFV-IFA 007).

Impact to SEC024-procedure: This "ID_VNF_instantiate" is sent by MANO to SM on one side, on a secure channel (i.e., TLS). It is also sent as a configuration parameter to the VNFC instance when it boots; this may happen between step-10 and step-11 with reference to FIG. 2 (before step-12).

This STEP-2 continues with fingerprinting the VNFC image, quote generation by the Attester in the HMEE (with reference to FIG. 1 and FIG. 3) covering this fingerprint, and correlation of quotes with the ID_VNF_instantiate as according to the following stages:

Stage-1—on the SM side: the SM uses ID_VNF_instantiate to compute a fingerprint of the VNFC instantiation. For example:

$$SM_{fingerprint_{VNFC_i}} = hash\left(hash_{image_i} \| ID_{VNF_{instantiate}}\right)$$

Where:
hash( ) is a one-way function as a hash function (e.g., sha-3).
$image_i$ is the VNFC image to be instantiated. Images are stored on repositories. For example, OS container images are stored on a Container Image Repository and are pulled just before step-9 in FIG. 2.
"$\|$" is the concatenation operator.
NOTE: although sufficient for a single-MANO deployment, this fingerprint may be enhanced to cover the VNFM_ID, i.e., the identity of the VNFM having allocated ID_VNF_instantiate. Based on the pre-computed ComponentRemoteAttestSet relation, the SM is able to identify and compute the $SM_{fingerprints}$ set for the corresponding VNFCs as soon as the ID_VNF_instantiate is available.
Stage-2—on the VNFC side: The VBS agent in the $VNFC_i$ computes the same fingerprint$_{VNFC_i}$ as above $$VNFCi_{fingerprint_{VNFC_i}} = hash\left(hash_{image_i} \| ID\_VNF\_instantiate\right)$$

and includes it in the quote generation as "user data". Then, the remote attestation quote is sent to the SM as part of step-17 in FIG. 2.
NOTE: for both stage-1 and stage-2: depending on how the VNF package is delivered (ETSI GS NFV-SOL 004), the $hash_{images}$ of the VNFCs may already be delivered by the VNF vendor in the VNF package (if the VNF Package is built with "Option-1" in ETSI GS NFV-SOL 004).
Stage-3—attestation quote correlation on the SM side:
Having started a timer for a duration of AttestTimeWindow($VNF_A$) upon reception of the VNF LCM event (here, VnfInstantiateRequest), the SM/Verifier receives the attestation quotes computed by the various VBS Agents and validates that the quote is in the context of current VNF instantiation. The following checks should all succeed for the VNFCI to be considered successfully attested:
The attestation quote signature is verified, and reference values are checked for this quote;
the ID_VNF_instantiate in both fingerprint$_{VNFC_i}$ fingerprints (computed by the SM and by the VBS agent) is the same;
The quote is received according the known AttestTimeWindow relation; and
The number of quotes including the same $hash_{image}$ is according to the known VNFCmaxInstantAttest relation.
It can be observed that any solution according to stage-2 requires the VNF vendor to implement the VNFC image fingerprinting in the VBS Agent (the hash operation can be executed in the "user space" and not necessarily in the HMEE).
The same objectives can be achieved without the VNF vendor fulfilling the requirement above. This is briefly discussed in the below solution variant.
In this different solution, the VNF vendor does not fulfil the requirement that the VNFC image fingerprinting is outsourced from the VBS Agent. This fingerprint is needed on the SM side (for stage-3 above) and this solution variant considers that an NFVI security agent (SA) is responsible of computing the $$VNFCi_{fingerprint_{VNFC_i}} = hash(hash_{image_i} \| ID\_VNF\_instantiate)$$

as per stage-2 above. This NFVI SA also associates the attestation quotes with these fingerprints to be sent to SM for quote correlation with the VNF LCM event (as per stage-3 above).

Compared to the original solution, the tradeoff is that NFVI SA has to be trusted to honestly behave in handling the image fingerprinting.

The information related to the attestation quote generation can be enhanced: one can, in the attestation, not only uses the knowledge of which VNFCs are forming the VNF but also a topology of how the VNFCs are connected. That information could be part of the fingerprint and thus be included in the quote. Therefore, one can benefit from a very complete characterization of the VNF by having this information about the connect/topology and the individual VNFCs.

Two different enhancements can therefore be provided.

The first enhancement is proposed knowing that the ETSI GS NFV-SEC 024-procedure does not particularly address multi-tenancy at the time of filing this application. But this enhancement is not restricted nor specific to multitenancy and can be applied in other scenarios where VNFCI cloning attempts is possible. In the context of the first enhancement, cloning means reproducing an existing legitimate VNFCI but outside the legitimate operations of VNF instantiation/scale-out/healing. The malicious user attempting to "clone" a VNFCI would start a VNFC image (boot the corresponding VM or launch a container image) and would try their best to have this remotely-attested.

Recall that the solution does not require a protected MANO-to-VNFCI channel (Ve-Vnfm-Vnf and the Sm-Sa in FIG. 1) during the SEC024-procedure; in other words this channel is "public" during this time. The implications are that an adversary can intercept, modify, block messages on the MANO-to-VNFCI channels.

This enhancement considers that ID_VNF_instantiate controlled by MANO (e.g., VNFM) is sent obfuscated to the VNFC instance. For example:

ID_VNF_instantiate*=obfuscation_function (ID_VNF_instantiate, . . . ), where obfuscation_function ( ) is a hash function; or an encryption function without revealing the encryption key. As such, obtaining a clear ID_VNF_instantiate value is computationally difficult just by observing ID_VNF_instantiate*.

MANO sends ID_VNF_instantiate to the SM/Verifier without any transformation on the MANO-SM secure channel (e.g., TLS session). The obfuscation_function (is revealed to the SM. Since the $$VNFCi_{fingerprint_{VNFC_i}}$$

on the VNFCi side is now applied on ID_VNF_instantiate*, in stage-1 the SM should also compute $$SM_{fingerprint_{VNFC_i}}$$

using ID_VNF_instantiate*.

Figure 5:
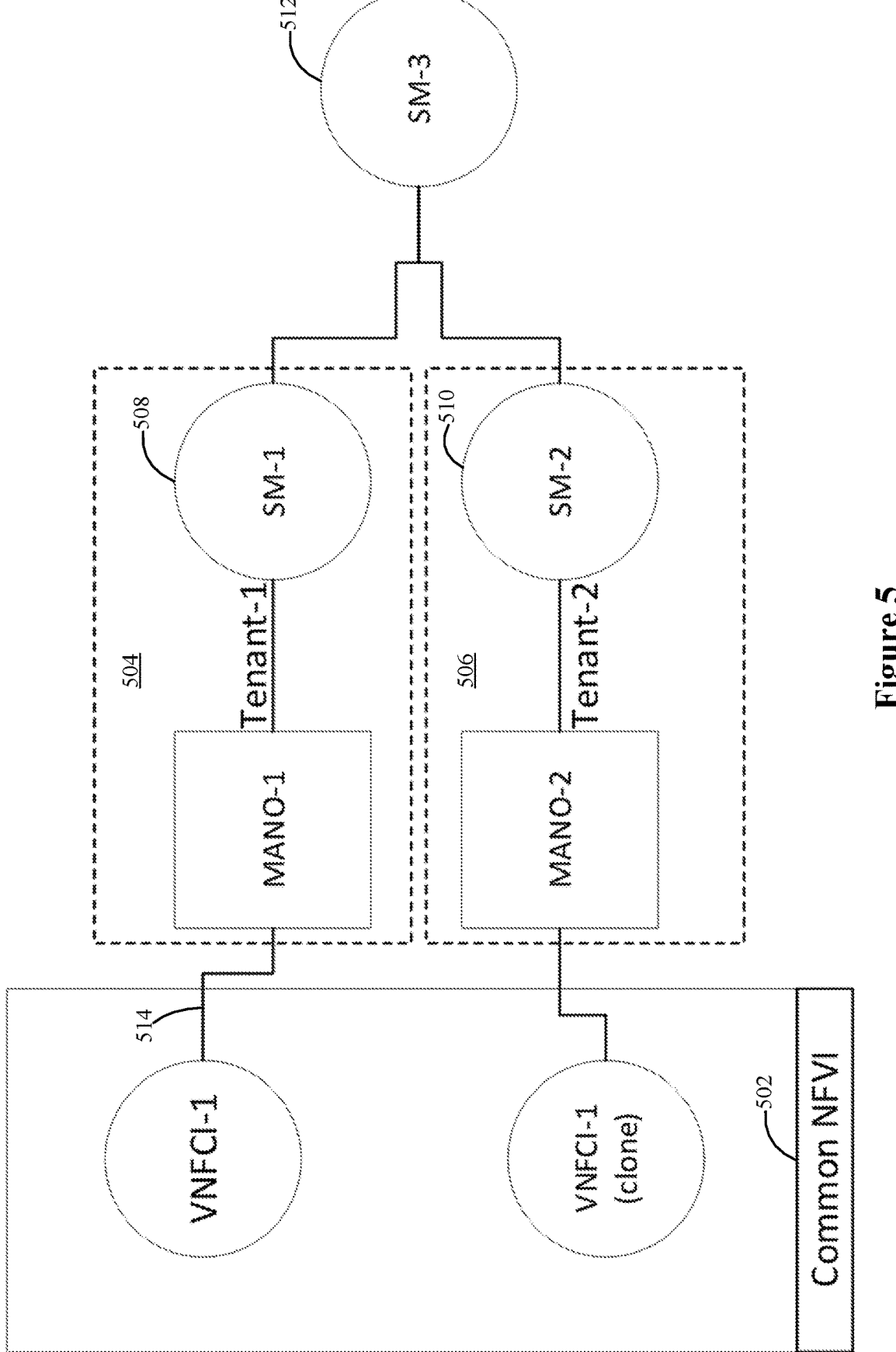
FIG. 5 is a block diagram illustrating an example using multitenancy.

Referring to FIG. 5, a particular multi-tenancy scenario which is "use case #1" in ETSI GR NFV-EVE 018 v0.0.14 (2021 October) Network Functions Virtualisation (NFV) Evolution and Ecosystem; Report on Multi-tenancy in NFV Release 4, one can grasp benefits from this enhancement, preventing the example attack described in what follows:

NFVI 502 is shared between two tenants (tenant-1, 504, and tenant-2, 506), each with their own NFVO/VNFM and their trusted domain. An SM instance is present in each domain (SM-1, 508, and SM-2, 510 respectively), but without the role of attestation Verifier.

Knowing that SMs can be arranged in a hierarchy, there is one SM embedding the attestation Verifier role common to both tenant domains. This is the SM-3/Verifier, 512, hierarchically higher than the other SMs. This SM-3, 512, receives the attestation quotes from both tenants 504, 506.

In case tenant-2, 506, behaves maliciously and launches a VNFC image requiring attestation attempt, which would be forbidden to tenant-2 (e.g., either by the relations described previously or simply because it is outside the context of a VNF LCM event for tenant-2), without the present enhancement proposing obfuscated IDs, this attempt may succeed during a legitimate VNFC instantiation using the same image from tenant-1:

At VNF instantiation by tenant-1 (involving the targeted image), malicious tenant-2 would observe the clear ID_VNF_instantiate ID on the MANO-1-to-VNFC channel 514 as well as the SM-nonce generated by SM-3 (step-12 in FIG. 2) and would block the quote response on this channel. Via the controlled VNFM-2, tenant-2 makes these ID_VNF_instantiate ID and SM-nonce available to the illegitimate VNFC image launch, resulting in an attestation quote generation that would verify (here it is assumed the right HMEE is present on the common NFVI; otherwise, both tenant-1 and tenant-2 would be forbidden that image launch) on the SM-3 side (tenant-2 also sends the ID_VNF_instantiate ID to SM-2 to reach SM-3).

SM-3 expecting to receive quotes based on the legitimate ID_VNF_instantiate ID (which the malicious tenant replays via SM-2) would validate the quote for the VNFC instantiated maliciously.

The proposed first enhancement prevents this attack: tenant-2 is not able to de-obfuscate the observed ID_VNF_instantiate*ID and to replay the clear ID_VNF_instantiate towards SM-3 via SM-2.

The second enhancement is useful for the solution variant proposed previously and in case there are many VNFC instantiations on the same NFVI, which must be verified quickly. The proposal is an attestation quote aggregation by the NFVI security agent to accelerate the quote signature validation in stage-3.

This enhancement considers a scheme where the NFVI security agent is not successively and separately sending the quotes with their signatures separately for every VNFCI. This NFVI security agents performs the following:

Based on a timer derived from AttestTimewindow the NFVI security agent collects the signed quotes on the NFVI (common to multiple VNFCIs).

At timer expiry, the collected quotes and signatures are aggregated using a particular signature aggregation scheme (see NOTE below); the aggregated result is sent in one message to the SM/Verifier, thus alleviating the Attester-Verifier signaling load; any other subsequent quotes are sent individually without aggregation.

At the SM/Verifier side, the aggregated signature can be verified directly for the set of VNFCIs having their quote signatures aggregated: if the aggregated signature is verified, that means authenticity of all initial individual quotes (signatures) are verified; this accelerates the SM/Verifier checks in stage-3, which is a step related to signatures check.

NOTE: signature aggregation techniques exist in the literature. The particular scheme in D. Boneh et al. Aggregate and Verifiably Encrypted Signatures from Bilinear Maps, in proceedings of Eurocrypt 2003, LNCS 2656, pp. 416-432, 2003 is proven to be very robust and suitable to the quote signature aggregation provided herein, but two mathematical structures are needed: (1) Elliptic Curve Cryptography (ECC) enhanced with (2) a bilinear-map. The scheme specifically requires that different signed messages have to be utilized for a successful aggregated signature verification; this is the case, given that the SM-nonces are different per VNFCs instance. The scheme doesn't require signature private keys to be handled by the NFVI security agent (quote aggregator), hence this agent does not need to be highly trusted.

The solution proposed herein not only ensures that the right software runs on the right NFVI when it is supposed to, but also provides a way to control VNFCI "initial credentials" acquiring and consequently a control over the VNFCI certificate enrolment: only upon a successful attestation the VNFCI is allowed to proceed with certificate requests and enrolment, and other security configurations. In short, this solution strengthens the binding of the remote attestation procedure with the certificate enrolment one.

FIG. 6 illustrates a method 600, executed in a security manager (SM), for correlating remote attestation quotes with a virtualized network function (VNF) resource allocation event. The method comprises obtaining, step 602, a set of VNF components (VNFCs) that require remote attestation. The method comprises obtaining, step 604, an attestation quote for each VNFC of the set of VNFCs, the attestation quote ensuring that instances of each VNFC are used in a legitimate context. The method comprises correlating, step 606, each attestation quote with the VNF resource allocation event.

The method may further comprise obtaining a number of VNFC instances that are permitted to be attested and an attestation time-window. The set of VNFCs, the number of VNFC instances that are permitted to be attested and the attestation time-window may be encoded for a VNF using a vdu_profile and NFVI constraints of a VNF descriptor and VNF package artifacts.

The method may further comprise notifying a network function virtualization (NFV) Management and orchestration (MANO) if the correlating of at least one attestation quote fails.

The VNF resource allocation event may be a lifecycle management (LCM) event such as a VNF instantiation, a VNF scale-out or a VNF healing, or any other relevant LCM event. Instantiation, scale-out and healing are operations that can be done with secure enclaves today, but operations such as migration could also become possible in the future.

The method may further comprise receiving, through a secure channel, a lifecycle operation identifier, for the LCM event, from a network function virtualization (NFV) Management and orchestration (MANO).

The correlating may comprise computing a first fingerprint of a VNFC image, the VNFC image corresponding to an instantiation of the VNFC. The first fingerprint may be computed using the lifecycle operation identifier received from the MANO. The first fingerprint may be included in the attestation quote. The correlating may further comprise computing a second fingerprint of a VNFC image. The second fingerprint may be computed using the lifecycle operation identifier. The first and second fingerprints may each comprise a characteristic computed from the VNFC image. The characteristic may be a hash value of the VNFC image.

The attestation quote may be generated in a Hardware-Mediated Execution Enclave (HMEE).

The correlating may further comprise verifying a signature and reference values of the attestation quote, verifying that the first and second fingerprints are the same, verifying that the attestation quote is received within the attestation time-window and verifying that a number of attestation quotes including a same hash value is lower or equal to the number of VNFC instances that are permitted to be attested.

The MANO may send an obfuscated version of the lifecycle operation identifier and a non-obfuscated version of the lifecycle operation identifier to the SM. The MANO may send to the SM an obfuscation function, that was used for obfuscating the lifecycle operation identifier sent. The method may further include any of the steps described previously.

Figure 7:
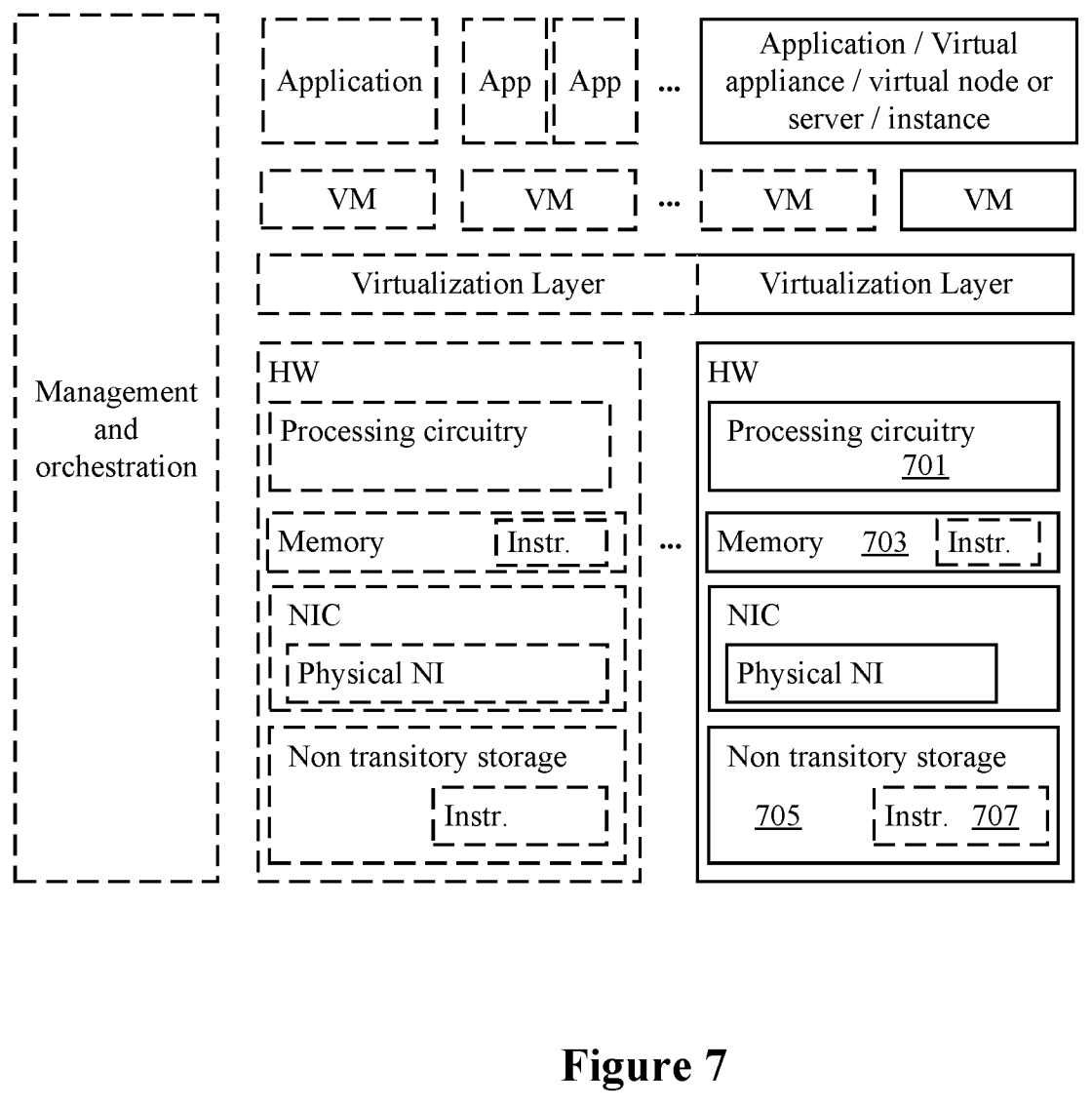

Referring to FIG. 7, there is provided a virtualization environment in which functions and steps described herein can be implemented.

A virtualization environment (which may go beyond what is illustrated in FIG. 7), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 701 and memory 703. The memory can contain instructions executable by the processing circuitry whereby functions and steps described herein may be executed to provide any of the relevant features and benefits disclosed herein.

The hardware may also include non-transitory, persistent, machine readable storage media 705 having stored therein software and/or instruction 707 executable by processing circuitry to execute functions and steps described herein.

The instructions 707 may include a computer program for configuring the processing circuitry 701. The computer program may be stored in a removable memory, such as a portable compact disc, portable digital video disc, or other removable media. The computer program may also be embodied in a carrier such as an electronic signal, optical signal, radio signal, or computer readable storage medium.

Referring to FIG. 7, a network node (HW) comprises processing circuits 701 and a memory 703, the memory containing instructions executable by the processing circuits whereby the network node executes a security manager (SM) for correlating remote attestation quotes with a virtualized network function (VNF) resource allocation event. The network node is operative to obtain a set of VNF components (VNFCs) that require remote attestation. The network node is operative to obtain an attestation quote for each VNFC of the set of VNFCs, the attestation quote ensuring that instances of each VNFC are used in a legitimate context. The network node is operative to correlate each attestation quote with the VNF resource allocation event.

The network node is further operative to obtain a number of VNFC instances that are permitted to be attested and an attestation time-window.

The set of VNFCs, the number of VNFC instances that are permitted to be attested and the attestation time-window may be encoded for a VNF using a vdu_profile and NFVI constraints of a VNF descriptor and VNF package artifacts.

The network node is further operative to notify a network function virtualization (NFV) Management and orchestration (MANO) if the correlating of at least one attestation quote fails.

The VNF resource allocation event may be a lifecycle management (LCM) event. The LCM event may be a VNF instantiation, a VNF scale-out or a VNF healing.

The network node is further operative to receive, through a secure channel, a lifecycle operation identifier, for the LCM event, from a network function virtualization (NFV) Management and orchestration (MANO).

The network node is further operative, when correlating, to compute a first fingerprint of a VNFC image, the VNFC image corresponding to an instantiation of the VNFC. The first fingerprint may be computed using the lifecycle operation identifier received from the MANO and the first fingerprint may be included in the attestation quote.

The network node is further operative, when correlating, to compute a second fingerprint of a VNFC image. The second fingerprint may be computed using the lifecycle operation identifier.

The first and second fingerprints may each comprise a characteristic computed from the VNFC image. The characteristic may be a hash value of the VNFC image. The attestation quote may be generated in a Hardware-Mediated Execution Enclave (HMEE).

The network node may be further operative, when correlating, to verify a signature and reference values of the attestation quote, verify that the first and second fingerprints are the same, verify that the attestation quote is received within the attestation time-window and verify that a number of attestation quotes including a same hash value is lower or equal to the number of VNFC instances that are permitted to be attested.

The network node is further operative to receive a non-obfuscated version of the lifecycle operation identifier and an obfuscation function from the MANO. The obfuscation function may be used by the MANO for obfuscating the lifecycle operation identifier.

The network node may further be operative to execute any of the steps described previously.

Still referring to FIG. 7, a non-transitory computer readable media 705 has stored thereon instructions for correlating remote attestation quotes with a virtualized network function (VNF) resource allocation event. The instructions comprise obtaining a set of VNF components (VNFCs) that require remote attestation. The instructions comprise obtaining an attestation quote for each VNFC of the set of VNFCs, the attestation quote ensuring that instances of each VNFC are used in a legitimate context. The instructions comprise correlating each attestation quote with the VNF resource allocation event. The instructions may further comprise any of the steps described previously. A person skilled in the art would understand that the operations effected in the network node described above could alternatively be executed by a system, or different parts thereof, as illustrated in FIG. 7, or by any other systems as described e.g., by ETSI or other standards organizations.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method, executed in a security manager (SM), for correlating remote attestation quotes with a virtualized network function (VNF) resource allocation event, comprising:

obtaining a set of VNF components (VNFCs) that require remote attestation;

obtaining an attestation quote for each VNFC of the set of VNFCs, the attestation quote ensuring that instances of each VNFC are used in a legitimate context; and correlating each attestation quote with the VNF resource allocation event;

wherein correlating further comprises:

computing a first fingerprint of a VNFC image, the VNFC image corresponding to an instantiation of the VNFC, wherein the first fingerprint is computed using a lifecycle operation identifier received from a Management and orchestration (MANO) and wherein the first fingerprint is included in the attestation quote;

computing a second fingerprint of a VNFC image, wherein the second fingerprint is computed using the lifecycle operation identifier;

verifying a signature and reference values of the attestation quote;

verifying that the first and second fingerprints are the same;

verifying that the attestation quote is received within an attestation time-window; and verifying that a number of attestation quotes including a same hash value is lower or equal to a number of VNFC instances that are permitted to be attested.

2. The method of claim 1, further comprising obtaining the number of VNFC instances that are permitted to be attested and the attestation time-window.

3. The method of claim 2, wherein the set of VNFCs, the number of VNFC instances that are permitted to be attested and the attestation time-window are encoded for a VNF using a vdu_profile and NFVI constraints of a VNF descriptor and VNF package artifacts.

4. The method of claim 1, further comprising notifying a network function virtualization (NFV) Management and orchestration (MANO) if the correlating of at least one attestation quote fails.

5. The method of claim 1, wherein the VNF resource allocation event is a lifecycle management (LCM) event.

6. The method of claim 5, wherein the LCM event is a VNF instantiation, a VNF scale-out or a VNF healing.

7. The method of claim 5, further comprising receiving, through a secure channel, a lifecycle operation identifier, for the LCM event, from a network function virtualization (NFV) Management and orchestration (MANO).

8. The method of claim, 1 wherein the first and second fingerprints each comprises a characteristic computed from the VNFC image.

9. The method of claim 8, wherein the characteristic is a hash value of the VNFC image.

10. The method of claim 1, wherein the attestation quote is generated in a Hardware-Mediated Execution Enclave (HMEE).

11. The method of claim 1, wherein the MANO sends an obfuscated version of the lifecycle operation identifier and a non-obfuscated version of the lifecycle operation identifier to the SM, and wherein the MANO sends to the SM an obfuscation function, that was used for obfuscating the lifecycle operation identifier.

12. A network node comprising processing circuits and a memory, the memory containing instructions executable by the processing circuits whereby the network node executes a security manager (SM) for correlating remote attestation quotes with a virtualized network function (VNF) resource allocation event, the network node being operative to:

obtain a set of VNF components (VNFCs) that require remote attestation;

obtain an attestation quote for each VNFC of the set of VNFCs, the attestation quote ensuring that instances of each VNFC are used in a legitimate context; and correlate each attestation quote with the VNF resource allocation event;

wherein correlating further comprises:

computing a first fingerprint of a VNFC image, the VNFC image corresponding to an instantiation of the VNFC, wherein the first fingerprint is computed using a lifecycle operation identifier received from a Management and orchestration (MANO) and wherein the first fingerprint is included in the attestation quote;

computing a second fingerprint of a VNFC image, wherein the second fingerprint is computed using the lifecycle operation identifier;

verifying a signature and reference values of the attestation quote;

verifying that the first and second fingerprints are the same;

verifying that the attestation quote is received within an attestation time-window; and verifying that a number of attestation quotes including a same hash value is lower or equal to a number of VNFC instances that are permitted to be attested.

13. The network node of claim 12, further operative to obtain the number of VNFC instances that are permitted to be attested and the attestation time-window.

14. The network node of claim 13, wherein the set of VNFCs, the number of VNFC instances that are permitted to be attested and the attestation time-window are encoded for a VNF using a vduprofile and NFVI constraints of a VNF descriptor and VNF package artifacts.

15. The network node of claim 12, further operative to notify a network function virtualization (NFV) Management and orchestration (MANO) if the correlating of at least one attestation quote fails.

16. The network node of claim 12, wherein the VNF resource allocation event is a lifecycle management (LCM) event.

17. The network node of claim 16, wherein the LCM event is a VNF instantiation, a VNF scale-out or a VNF healing.

18. The network node of claim 16, further operative to receive, through a secure channel, a lifecycle operation identifier, for the LCM event, from a network function virtualization (NFV) Management and orchestration (MANO).

19. The network node of claim 12, wherein the first and second fingerprints each comprises a characteristic computed from the VNFC image.

20. The network node of claim 19, wherein the characteristic is a hash value of the VNFC image.

21. The network node of claim 12, wherein the attestation quote is generated in a Hardware-Mediated Execution Enclave (HMEE).

22. The network node of claim 12, further operative to receive a non-obfuscated version of the lifecycle operation identifier and an obfuscation function from the MANO, wherein the obfuscation function is used by the MANO for obfuscating the lifecycle operation identifier.

23. A non-transitory computer readable media having stored thereon instructions for correlating a remote attestation quote with a virtualized network function (VNF) resource allocation event, the instructions comprising:

obtaining a set of VNF components (VNFCs) that require remote attestation;

obtaining an attestation quote for each VNFC of the set of VNFCs, the attestation quote ensuring that instances of each VNFC are used in a legitimate context; and correlating each attestation quote with the VNF resource allocation event;

wherein correlating further comprises:

computing a first fingerprint of a VNFC image, the VNFC image corresponding to an instantiation of the VNFC, wherein the first fingerprint is computed using a lifecycle operation identifier received from a Management and orchestration (MANO) and wherein the first fingerprint is included in the attestation quote;

computing a second fingerprint of a VNFC image, wherein the second fingerprint is computed using the lifecycle operation identifier;

verifying a signature and reference values of the attestation quote;

verifying that the first and second fingerprints are the same;

verifying that the attestation quote is received within an attestation time-window; and verifying that a number of attestation quotes including a same hash value is lower or equal to a number of VNFC instances that are permitted to be attested.

* * * * *